United States Patent
Jayaraj

(10) Patent No.: US 10,175,921 B2
(45) Date of Patent: Jan. 8, 2019

(54) METHOD AND SYSTEM FOR INTERACTION BETWEEN DISPLAYS IN A COCKPIT OF AN AIRCRAFT

(71) Applicant: ROCKWELL COLLINS INC., Cedar Rapids, IA (US)

(72) Inventor: Harish B. Jayaraj, Hyderabad (IN)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 150 days.

(21) Appl. No.: 14/993,445

(22) Filed: Jan. 12, 2016

(65) Prior Publication Data

US 2016/0313961 A1    Oct. 27, 2016

(30) Foreign Application Priority Data

Apr. 22, 2015   (IN) .......................... 1115/DEL/2015

(51) Int. Cl.
*G06F 3/14*    (2006.01)
*G06T 1/20*    (2006.01)

(52) U.S. Cl.
CPC .......... *G06F 3/1423* (2013.01); *G06F 3/1454* (2013.01); *G09G 2340/0407* (2013.01); *G09G 2340/0464* (2013.01); *G09G 2380/12* (2013.01)

(58) Field of Classification Search
CPC ................. G06F 3/1423; G06F 3/1454; G06F 2203/04104; G06F 3/0482; G06F 3/04845; G06F 3/04847; G06F 3/04886; G06F 3/0489; G06F 3/147; G09G 2340/0407; G09G 2340/0464; G09G 2380/12; G09G 2330/08; G09G 2354/00; G09G 5/12; G09G 5/14; G09G 5/38
See application file for complete search history.

(56) References Cited

U.S. PATENT DOCUMENTS

| | | | | |
|---|---|---|---|---|
| 2007/0016345 | A1* | 1/2007 | Plogmann | G01C 23/005 701/3 |
| 2009/0055767 | A1* | 2/2009 | Cabaret | G01C 23/00 715/771 |
| 2011/0130897 | A1* | 6/2011 | Gladysz, Jr. | G01C 23/00 701/15 |
| 2014/0070965 | A1* | 3/2014 | Letsu-Dake | G01C 23/00 340/971 |
| 2016/0057032 | A1* | 2/2016 | Tieftrunk | G01C 21/00 701/533 |

* cited by examiner

*Primary Examiner* — Hong Zhou
(74) *Attorney, Agent, or Firm* — Donna P. Suchy; Daniel M. Barbieri

(57) ABSTRACT

A system for interaction between cockpit display units, said system comprising: a first display unit configured to display one or more flight data in a predetermined format; a first display processing unit operatively coupled to said first display unit; a second display unit; a second display processing unit operatively coupled to said second display unit; wherein the first display processing unit is operatively connected to the second display processing unit; the second display processing unit is configured to process the command signal received from the first display processing unit; and the second display unit is configured to display data associated with the first display unit based on the processed command signal by the second display processing unit.

10 Claims, 5 Drawing Sheets

METHOD AND SYSTEM FOR INTERACTION BETWEEN DISPLAYS IN A COCKPIT OF AN AIRCRAFT

FIELD OF THE INVENTION

The present invention generally relates to displays in a cockpit of an aircraft and more particularly, relates to a method and system for interaction between displays of pilot and co-pilot in an aircraft.

BACKGROUND OF THE INVENTION

Contemporary aircraft cockpit includes multiple cockpit display units, which display to the pilot and co-pilot, a wide range of aircraft, flight, navigation, and other information pertaining to the operation and control of the aircraft. Typically, most of the cockpits include at least two display units, one each for the pilot and the co-pilot to view information that is relevant in context of the flight and aircraft. Such information can be various flight parameters such as horizontal altitude, vertical altitude, heading direction etc; or various aircraft parameters such as fuel status, engine status etc; or other static or dynamic information such as route map, flight plan etc.

Both pilot and co-pilot can separately view selected/desired information or parameters on their respective display units and thus can select the display layout as per their discretion to view the selected information. At many instances, the information viewed by the pilot and co-pilot is different. In other words, more often, the display format of the pilot's display unit and co-pilot's display unit is different from each other. For example, at any specific instance, the pilot is viewing the flight parameters on one portion of the display and a route map on another portion of the display; and in contrary, the co-pilot is viewing the aircraft parameters on the whole display unit. At such an instance, if the pilot wishes to share with the co-pilot, some insight pertaining to a specific information (say a route map), that is not currently being viewed on the co-pilot's display unit, the pilot has to verbally communicate with the co-pilot asking the co-pilot to look at the information on the display unit of the pilot. Such a verbal communication is time consuming and also requires diversion of the attention of the pilot and co-pilot from flying the aircraft.

Such a limitation/problem exists due to lack of a provision by which the pilot and co-pilot can share the particular information on the display units of each other. The sole interaction that exists between the display units is when one of the display units fails and other display units on recognizing the failure switch to reversion mode that signals the active display unit to display all flight critical parameter in one particular format. In other words, in normal circumstances when all the display units are active, there is no provision by which the pilot and co-pilot can interact through their respective display units.

Accordingly, in order to overcome the aforementioned limitations, there is a need of a method and a system, wherein the cockpit display units interact and share each other's display format. Also, there is a need of a system, wherein the cockpit display unit modifies its display format when receiving the instructions from the other cockpit display unit.

SUMMARY OF THE INVENTION

The objective of the present invention is to provide a system for interaction between display units of pilot and co-pilot in cockpit of an aircraft, wherein the pilot is enabled to configure the display unit of co-pilot so as to display the same data on the co-pilot's display unit as viewable by the pilot.

The objective of the present invention is to provide a method for interaction between display units of pilot and co-pilot in cockpit of an aircraft, wherein the pilot is enabled to configure the display unit of co-pilot so as to display the same data on the co-pilot's display unit as viewable by the pilot.

DETAILED DESCRIPTION OF THE PRESENT INVENTION

Figure 1:
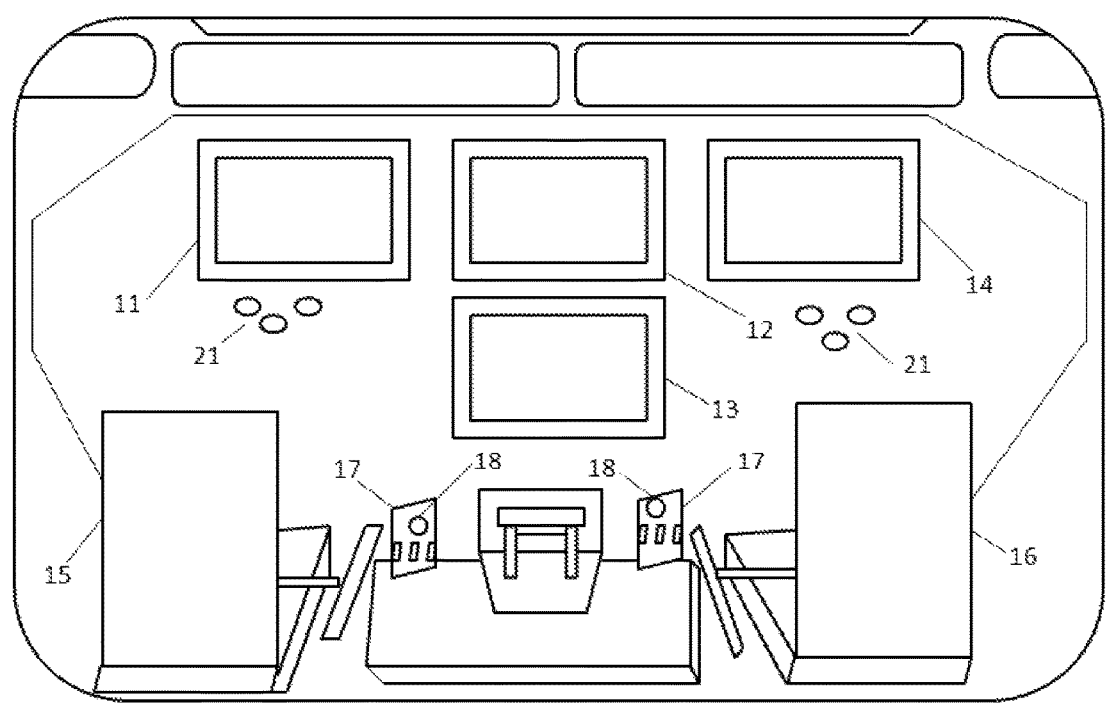
FIG. 1 illustrates a cockpit of an aircraft.

FIG. 1 illustrates a cockpit 100 of an aircraft. The cockpit 100 comprises a seat 15 on a left side of the cockpit 100 for a pilot to be seated and a seat 16 on a right side of the cockpit 100 for a co-pilot to be seated. The cockpit 100 further comprises various flight/cockpit instruments 21 such as engine instruments, navigational and communication equipments, present on a deck of the cockpit 100. The cockpit 100 further comprises cockpit display units 11-14 that are positioned in front of the pilot and co-pilot and provides them with information to aid in flying the aircraft. In an embodiment of the present invention, the cockpit display unit 11 is positioned in front of the pilot seat 15 so that the pilot seated on the seat 15 can view information pertaining to the flight/aircraft on the cockpit display unit 11 and similarly, the cockpit display unit 14 is positioned in front of the co-pilot seat 16 so that so that the co-pilot seated on the seat 16 can view information pertaining to the flight/aircraft on the cockpit display unit 14. Also, the display units 12, 13 are provided which is common to both pilot and co-pilot and displays flight data which are accessed by both pilot and co-pilot during course of flight.

The cockpit display units 11-14 include, but are not limited to primary flight display (PFD) and multi-function display (MFD). The primary flight display (PFD) displays all information critical to flight, including calibrated airspeed, altitude, heading, vertical speed and the like. The PFD is designed to improve a pilot's situational awareness by integrating this information into a single display instead of six different analog instruments, thus reducing the amount of time necessary to monitor the instruments. The PFDs also increase situational awareness by alerting the pilots to unusual or potentially hazardous conditions, for example, low airspeed, high rate of descent, by changing the color or shape of the display or by providing audio alerts. The multi-function display (MFD) displays navigational and weather information from multiple systems. The MFDs are most frequently designed as "chart-centric", where the pilot can overlay different information over a map or chart. The MFD can also be used to view other non-overlay type of data (e.g., current route plan) and calculated overlay-type data, e.g., the glide radius of the aircraft, given current location over terrain, winds, and aircraft speed and altitude. The MFDs can also display information about aircraft systems, such as fuel and electrical systems. Similar to the PFD, the MFD can change the color or shape of the data to alert the pilots to hazardous situations.

In an embodiment of the invention, the cockpit display units 11-14 are touch controlled displays that can be used by the pilot or co-pilot to interact with aircraft system by touching the display screen with a stylus/pen and/or one or more fingers. For example, a tap on the display unit 11 by a pilot, brings up a context-sensitive menu that let the pilot control things such as speed, altitude and heading of the aircraft with just a couple of taps. In a further embodiment of the invention, the touch-controlled display units 11-14 are multi-touch controlled such that the display units 11-14 are operative to detect simultaneous presence of more than one point of contact (i.e. multiple contacts) on the display surface. Such multi-touch enabled display surfaces are also known as gesture-controlled display surfaces. The display units 11-14, being multi-touch enabled, can detect various known gestures such as tap, double tap, pinch, zoom, rotate, long press, pan, scroll, flick, two finger tap, two finger scroll, naming a few. For example, the pilot can input a gesture such as a couple of taps on the display unit 11, by which the screen layout can be split into two, three or four windows and the elements of the individual windows can be customized by dragging and dropping icons to provide a wealth of relevant flight information at a glance to aid the pilot. Such touch-controlled interface of the display units 11-14 makes the cockpit more user-friendly and keeps the pilot's eyes focused up.

Further, cursor control devices, such as mouse 17, and multifunction keyboards 18 are included in the cockpit system 100 to allow the pilot and co-pilot to interact with the aircraft system. For example, the pilot and/or co-pilot can use the mouse 17 and keyboard 18 to give an input command to the system via the display units 11-14 to control things such as speed, altitude and heading of the aircraft.

Figure 2:
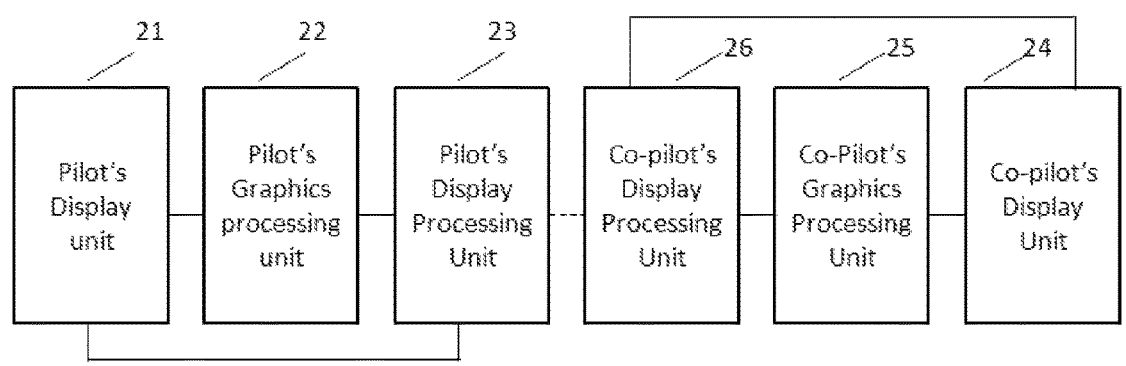
FIG. 2 illustrates a cockpit display system according to an embodiment of the present invention.

FIG. 2 illustrates a cockpit display system 200 according to an embodiment of the present invention. The cockpit display system 200 comprises a pilot's display unit 21 and co-pilot's display unit 24 (illustrated as cockpit display units 11-14 in FIG. 1). The display unit 21 is operatively coupled to and controlled by a display processing unit (DPU) 23. The display processing unit 23 is operative to receive an input command from the pilot, via the display unit 21; process the received input command and perform an operation based on the processed command. In an implementation, the display processing unit has an associated commands library implemented in a memory (not shown in FIG. 2). When the DPU 23 receives a particular command via the display unit 21, the DPU 23 looks up in the command library to perform an operation associated with the received command. For example, if a pilot taps twice on the display unit 21, the DPU 23 looks up in the command library to perform an associated action. In, the commands library, if the tapping twice is associated with a change of the display format, the DPU 23 changes the display format of the display unit 21 accordingly.

The display unit 21 is further coupled to a graphics processing unit 22 that generates graphics for data to be displayed on the display unit 21. The graphics processing unit 22 has associated frame buffers (not shown in FIG. 2) that stores the generated graphics to be displayed on the display unit 21. In an implementation, the graphics processing unit 22 provides the generated graphics, in a pixel layout, to the display processing unit 23 that further transmits the received graphics, in the pixel layout, to the display unit 21 for displaying the received graphics.

The display unit 24 is similarly coupled to a display processing unit (DPU) 26 and a graphics processing unit (GPU) 25 that perform similar operation and are similar in implementation as the display processing unit 23 and the graphics processing unit 22 respectively, with respect to the display unit 24.

In an embodiment of the invention, an initial data is displayed on pilot's display unit (21) according to the preset format. The pilot according to his desire may change the format of data to be displayed on the display unit 21. In an implementation, the DPU 23 based on instructions from pilot for re-configuration of the display data, sends an instruction to the graphics processing unit (GPU) 22 to reconfigure the display layout in the form of graphics. The GPU (22) upon reconfiguring the display layout, forward the display to the pilot's display unit 21 for display according to selected graphics layout.

The pilot desiring to share the same display screen as currently displayed on display unit 21 with the co-pilot's display unit 24, initiate an input command at the display unit 21, wherein the input command is provided by the pilot. The display processing unit 23 processes the received input command. As illustrated above, the DPU 23 looks up in the command library to perform an operation associated with the input command. In an embodiment of the invention, the input command is associated with displaying the current display layout of the display unit 21 with display unit 24. Hence, based on processing the input command, the DPU 23 forwards the command to the DPU 26.

In an implementation, the DPU 23 sends the display layout to the display processing unit 26 that further transmits the received display layout to the graphics processing unit 25 that processes the received display layout to generate graphics based on the received display layout; and transmits the generated graphics to the display unit 24. The graphics as displayed on the display unit 24 are similar to the layout as seen on the display unit 21. In other words, the display layout of the display unit 24 is similar to the display layout of the display unit 21 i.e. primary function display (PFD) parameters on a left half of the display and a route map on a right half of the display. Hence, the present invention provides for a system, wherein input commands provided by the pilot, via the pilot's display unit, modifies the display layout of the co-pilot's display unit to make the said display layout similar to the display layout of the pilot's display unit.

In another embodiment of the invention, the co-pilot can re-configure the display format of the display unit 24 according to the preferred format. In an embodiment, the display unit 24 is provided with one or more options, which enables displaying an alternate format of the data as preferred by the co-pilot. In an exemplary embodiment, the co-pilot can re-configure the display format from a full format to a half format, or full format to a quarter format, or from a half format to a quarter format and vice-versa. The display processing unit 26 processes the received input command and re-configures the display format of the display unit 24.

In an embodiment of the invention, the input commands are given by the pilot by either using the cursor control device such as mouse 18 or by inputting touch gestures on the touch-enabled screen of the display unit 21. Exemplary embodiments of the invention are illustrated in FIGS. 3 and 4.

Figure 3:
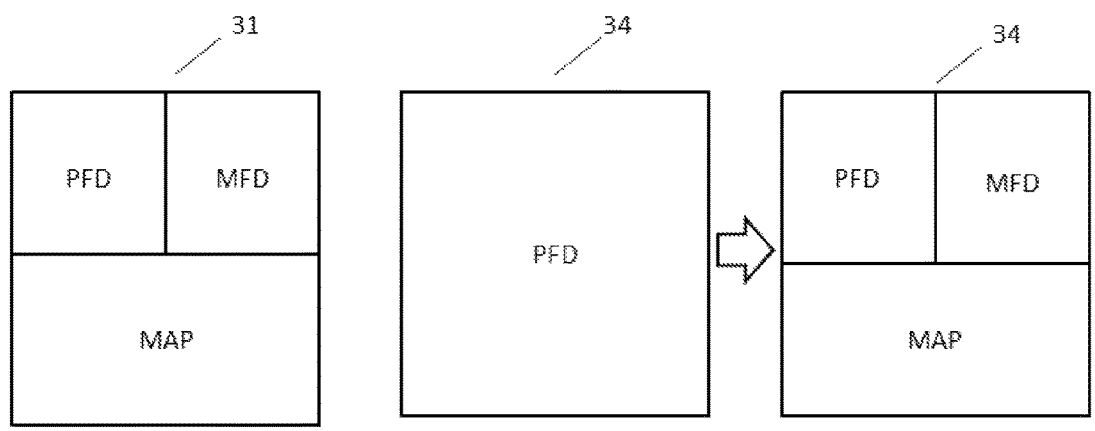
FIG. 3 illustrates an exemplary embodiment of the present invention.
Figure 4:
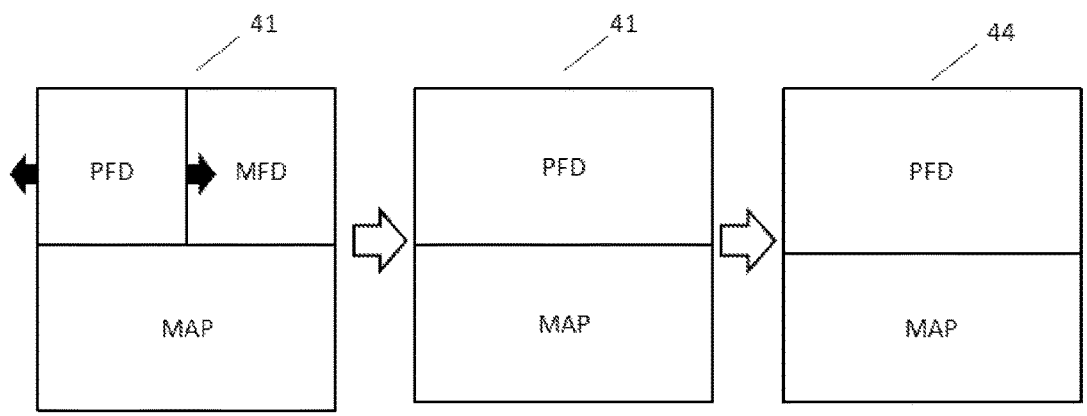
FIG. 4 illustrates an exemplary embodiment of the present invention.

FIG. 3 illustrates an exemplary embodiment of the present invention for interaction between display unit of pilot and co-pilot in a cockpit of an aircraft. The pilot's display unit 31 has a layout as shown in FIG. 3. On a left portion of a first half (upper half) of the display unit 31, primary function display (PFD) parameters are being viewed. On a right portion of the first half of the display unit 31, multi-function display (MFD) parameters are being viewed. On a second half (bottom half) of the display unit 31, a route map is being viewed by the pilot. On the other hand, the co-pilot is viewing PFD parameters on his display unit 34.

In accordance with an embodiment of the present invention, the display layout of the co-pilot's display unit 34 is modified to make the said layout similar to the display layout of the pilot's display unit 31. As described previously with reference to FIG. 2, in response to receiving the command from the pilot at the pilot's display unit 31, the display layout of the co-pilot's display unit 34 is modified to be similar to the display layout of the pilot's display unit 31. In an implementation, on receiving the input command, the display layout of the pilot's display unit 31 is stored and the stored display layout of the pilot's display unit 31 is pushed/transmitted to the co-pilot's display unit 34, which on receiving the layout graphics, modifies it's layout to make the layout similar to received layout. Hence, as shown in FIG. 3, the display layout of the co-pilot's display unit 34 is modified to view/show primary function display (PFD) parameters on a left portion of a first half (upper half) of the display unit 34 and multi-function display (MFD) parameters on a right portion of the first half of the display unit 34. Similarly, the route map is being viewed on a second half (bottom half) of the display unit 34. Thus, the display layout of the display unit 34 becomes similar to the display layout of the display unit 31.

As discussed above with reference to FIG. 2, the input commands may be given by the pilot by either using the cursor control device such as mouse or by inputting touch gestures on the touch enabled screen of the display unit. In the exemplary embodiment, the input command may be provided for example by sliding three fingers on the display unit 31 in the direction of the display unit 34. In another exemplary embodiment, the input command may be provided by holding left/right click of the mouse and dragging the mouse on the display unit 31 in the direction of the display unit 34.

FIG. 4 illustrates an exemplary embodiment of the present invention. As illustrated in FIG. 3, the display layout of the co-pilot's display unit 44 is modified to be similar to the display layout of the pilot's display unit 41 i.e. on the left portions of the first halves (upper halves) of the display units 41 and 44; primary function display (PFD) parameters are being viewed. On the right portions of the first halves of the display units 41 and 44, multi-function display (MFD) parameters are being viewed. On the second halves (bottom halves) of the display units 41 and 44, the route map is being viewed by the pilot and the co-pilot.

In the embodiment of the present invention, the pilot re-configures the format of the display unit 41 to view PFD parameters only on the first half (upper half) of the display unit 41. The pilot desiring to share the current display format with the co-pilot's display unit, inputs a command on the display unit 41. Pursuant to receiving the said input command, the display unit 44 of the co-pilot is reconfigured to display the data in same format similar to pilot's display unit 41. In an exemplary embodiment, the pilot re-configures the display unit 41 to view PFD parameters only on the first half (upper half) by pinching out operation performed by holding two parallel boundaries of the left portion of the first half of the display unit 4 to expand left portion of the first half of the display unit 41 to occupy whole first half. In another exemplary embodiment, the input command to display the same display on the co-pilot display unit 44 is provided for example by dragging the mouse holding left/right click of the mouse from the right boundary of the left portion of the display unit 41 till the right boundary of the right portion of the display unit 41.

The input commands as discussed in respect to FIGS. 3 and 4 are exemplary commands and a plurality of the gestures/commands on the touch controlled display units or the cursor control device such as mouse can be used as the input commands and will suggest themselves to those skilled in this art in light of the above described embodiments.

In another variation of the aforementioned embodiment, the format of the display units 41 and 44 can be modified to have un-even sizes, instead of conventional half, quarter and full formats, of the multiple portions of the display. Multiple variations of the aforementioned embodiment would suggest themselves to a person skilled in the art.

Figure 5:
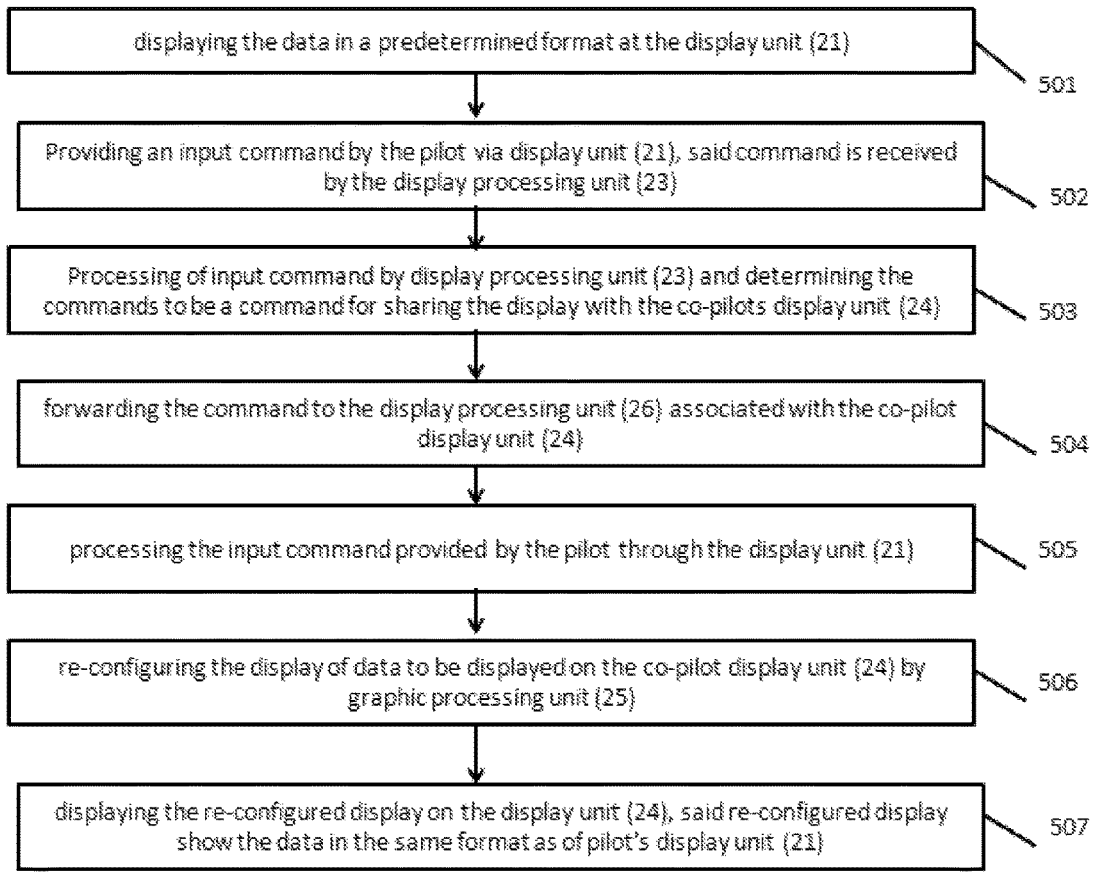
FIG. 5 is a flow chart illustrating the process of interaction between the cockpit display units according to the embodiments of the present invention A more complete understanding of the present invention and its embodiments thereof may be acquired by referring to the following description and the accompanying drawings.

FIG. 5 illustrates the process of interaction between the cockpit display units according to the embodiments of the present invention. The process begins at step 501, which displays the data in a predetermined format at the display unit 21; In step 502, an input command is provided by the pilot via display unit 21, said command is received by the display processing unit 23; in step 503, the input command is processed by the display processing unit 23 and determining the commands to be a command for sharing the display with the co-pilots display unit 24; in step 504, forwarding the command to the display processing unit 26 associated with the co-pilot display unit 24; in step 505, processing the input command provided by the pilot through the display unit 21; in step 506, re-configuring the display of data to be displayed on the co-pilot display unit 24 by graphic processing unit 25 and in step 507, displaying the re-configured display on the display unit 24, said re-configured display show the data in the same format as of pilot's display unit 21.

The invention as described above has numerous advantages. The proposed invention enhances the interaction between the pilot and co-pilot of the aircraft via the cockpit display units. The proposed invention allows the pilot to modify the display layout and format of the cockpit display unit in front of the co-pilot via input commands/gestures that allows the pilot and co-pilot to share the same display layout and format. Thus, at such an instance, when pilot wants to share some specific insight, the pilot can bring that information on the co-pilot's cockpit display unit and thus allowing the pilot to share the information without verbally communicating with the co-pilot. Morever, the co-pilot can look at the information in his cockpit display unit instead of the pilot's display unit that does not divert the attention of the co-pilot. Such a method and system for interaction of the pilot and co-pilot via the cockpit display units improves the efficiency of the pilot and co-pilot thus reducing the chance of accidents or incidents.

The invention has been described above with reference to numerous embodiments and specific examples. Many variations will suggest themselves to those skilled in this art in light of the above detailed description. All such obvious variations are within the full intended scope of the appended claims.

What is claimed is:

1. A system for interaction between cockpit display units, the system comprising:
   a first display unit configured to display one or more flight data in a predetermined format, the first display unit associated with a first viewer;
   a first display processing unit operatively coupled to the first display unit;
   a second display unit associated with a second viewer;
   a second display processing unit operatively coupled to the second display unit;
   wherein the first display processing unit is operatively connected to the second display processing unit;
   wherein the second display processing unit is configured to process a command signal received from the first display processing unit;
   wherein the second display unit is configured to display data associated with the first display unit based on the processed command signal by the second display processing unit; and
   wherein the second display unit is configured to initially display the data according to the predetermined format, and to subsequently display the data according to a preferred format of the second viewer without altering the format of the data displayed on the first display unit.

2. The system of claim 1, wherein the second display processing unit is coupled to a graphics processing unit, the graphics processing unit is configured to generate an image associated with processed data on the second display processing unit.

3. The system of claim 1, wherein the first display unit and the second display unit comprise at least a primary flight display (PFD) and multi-function display (MFD).

4. The system of claim 1, wherein the data displayed on the second display unit is in a predetermined format and optionally reconfigurable to any other format.

5. The system of claim 1, wherein the first display unit comprises one or more options to initiate the command signal, wherein the command signal is processed by first display processing unit and is forwarded to the second display processing unit, and wherein the command signal causes the second display processing unit to display information on a portion of the second display unit different from information displayed on the first display unit.

6. The system of claim 5, wherein the command signal is initiated by a gesture.

7. A method of providing interaction between display units of pilot and co-pilot in an aircraft, the method comprising:
   displaying data in a predetermined format on a first display unit, the first display unit associated with a pilot;
   generating a command signal via the first display unit;
   receiving the command signal by a first display processing unit;
   processing the command signal by the first display processing unit to determine display data for a second display unit, the second display unit associated with a co-pilot;
   forwarding the command signal to a second display processing unit;
   processing the command signal by the second display processing unit; and
   displaying the data on the second display unit initially according to the predetermined format and subsequently displaying the data according to a preferred format of the co-pilot without altering the format of the data displayed on the first display unit, and wherein the preferred format of the co-pilot is different from the predetermined format.

8. The method of claim 7, wherein processing the command signal by the second display processing unit further comprises generating a display graphic to be displayed on the second display unit by a second graphic processing unit.

9. The method of claim 7, further comprising reconfiguring the predetermined format as displayed on the second display unit to any other format.

10. The method of claim 7, further comprising providing a command at the first display unit by at least a touch, gesture, input device or a keyboard.

* * * * *